June 12, 1962 J. F. ZALESKI 3,038,992

AMPLIFIER FOR MODULATED MICROWAVES

Filed Sept. 28, 1959

2 Sheets-Sheet 1

INVENTOR.
JOHN F. ZALESKI
BY H. L. Mackey
ATTORNEY

June 12, 1962 J. F. ZALESKI 3,038,992

AMPLIFIER FOR MODULATED MICROWAVES

Filed Sept. 28, 1959 2 Sheets-Sheet 2

INVENTOR.
JOHN F. ZALESKI

BY H. L. Mackey

ATTORNEY

United States Patent Office 3,038,992
Patented June 12, 1962

3,038,992

AMPLIFIER FOR MODULATED MICROWAVES

John F. Zaleski, Pleasantville, N.Y., assignor to General Precision, Inc., a corporation of Delaware Filed Sept. 28, 1959, Ser. No. 842,787
7 Claims. (Cl. 250—20)

This invention relates to apparatus for amplifying modulated microwave energy.

Conventional microwave amplifiers usually comprise vacuum tubes such as travelling wave tubes and klystrons. Such devices are satisfactory for many purposes but are subject to the disadvantages of complexity, high cost and limited life expectancy. Additionally, they ordinarily are not well suited to operation from low level inputs. A further limitation is that, when used for amplifying modulated microwaves, the frequency of the output carrier must be the same as that of the input carrier.

It is an object of the present invention to provide simple inexpensive apparatus for amplifying modulated microwave energy.

Another object is to provide apparatus for accepting low amplitude modulated microwave energy and delivering modulated microwave energy of higher amplitude.

Another object is to provide apparatus for changing the carrier frequency of modulated microwave energy.

Briefly stated, the invention includes a passive element which converts the input modulated microwave energy to mechanical motion corresponding to the modulation envelope. The passive element then utilizes the mechanical motion to modulate microwave energy from another source the frequency of which may be the same as or different from that of the original carrier.

For a clearer understanding of the invention reference may be made to the following detailed description and the accompanying drawing, in which.

Figure 1:
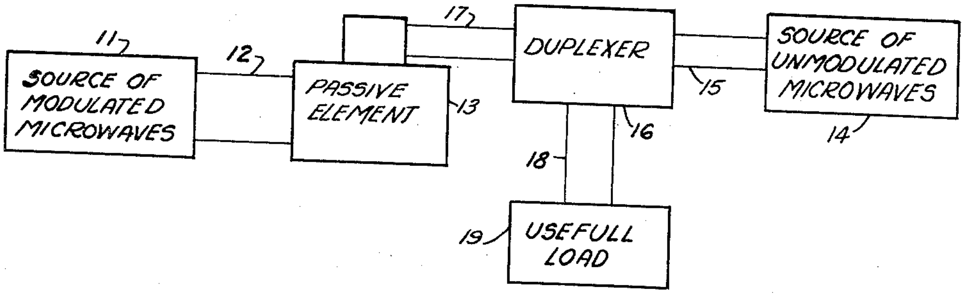
FIGURE 1 is a block diagram of a system incorporating the invention.

Referring first to FIG. 1 there is shown a source 11 of modulated microwave energy which it is desired to amplify. This energy is led by means of a waveguide 12 to a passive element 13 which is shown in outline only and which will be fully described subsequently.

There is also shown a source 14 of unmodulated microwave energy which serves as the carrier of the modulated output and the frequency of which may be the same as or different from that of the source 11, depending upon the design of the passive element 13. For illustrative purposes the element 13 is shown as being designed for an output frequency higher than the input frequency and accordingly source 14 has a higher frequency than source 11.

The output of source 14 is led via a waveguide 15, a duplexer 16 and a waveguide 17 to the passive element 13. The duplexer 16 may, for example, be a ferrite polarization rotating device which permits microwave energy entering from waveguide 15 to flow only to waveguide 17 and which permits microwave energy entering from waveguide 17 to flow only to waveguide 18 and thence to a load device 19.

The operation may be somewhat sketchily described at this point. Modulated microwave energy from the source 11 enters the passive element 13 where it causes a small diaphragm to vibrate in accordance with the modulation envelope, much as the diaphragm of a telephone receiver vibrates in accordance with the audio signal flowing in its voice coil. Microwave energy from the source 14 also enters the passive element 13 where it is modulated by the motion of the internal diaphragm. The modulated energy is led via the waveguide 17, the duplexer 16 and the waveguide 18 to the load device 19.

Figure 2:
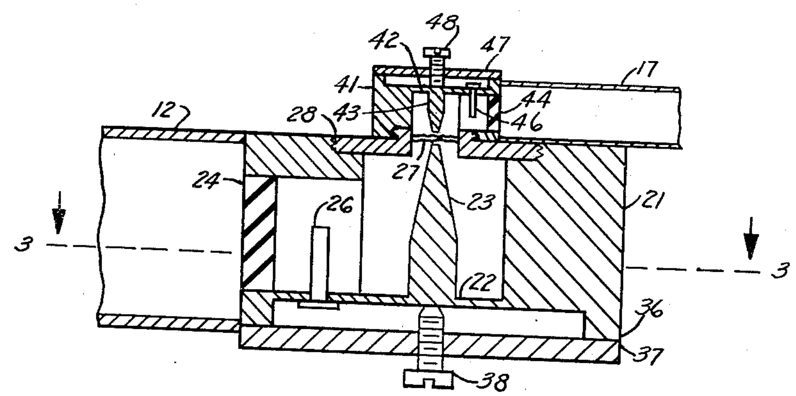
FIGURE 2 is an enlarged vertical cross sectional view of the passive element.
Figure 3:
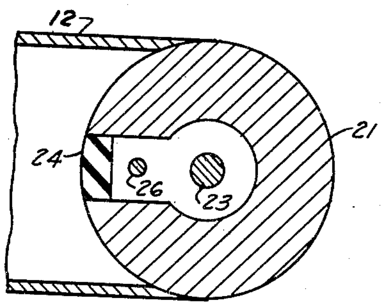
FIGURE 3 is an enlarged horizontal cross sectional view of the passive element taken on the line 3—3 of FIG. 2.

Turning now to FIGS. 2 and 3, the main body of the passive element 13 comprises a generally cylindrical block 21 of metal such as brass having an axial bore extending from one end almost to the other end but stopping short so as to leave a base portion 22. Integral with the base portion 22 is an upstanding post 23 the upper portion of which is frusto conical in shape. The space defined by the inner surface of the block 21, the base 22 and the post 23 constitutes a resonant cavity the dimensions of which are selected to make the cavity resonant at the frequency of the input modulated microwave energy. A circular passageway perpendicular to the cylindrical axis couples the cavity to the exterior of the block 21 and is provided at its outer end with a dielectric window 24 of polystyrene, tetrafluoroethylene or other substance transparent to microwaves. The waveguide 12 is soldered or otherwise fastened to the block 21 in such a position that microwave energy from the source 11 (FIG. 1) will be transmitted through the window 24 and the circular passageway to the resonant cavity. A metal tuning screw 26 protrudes into the orifice so that the amount of coupling between the waveguide 12 and the resonant cavity can be selected for best results. Once positioned, the screw 26 requires no further adjustment and may be soldered in place.

Figure 4:
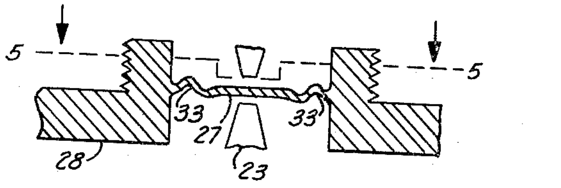
FIGURE 4 is a greatly enlarged fragmentary vertical cross sectional view taken on the same plane as FIG. 2, showing the construction of the diaphragm.
Figure 5:
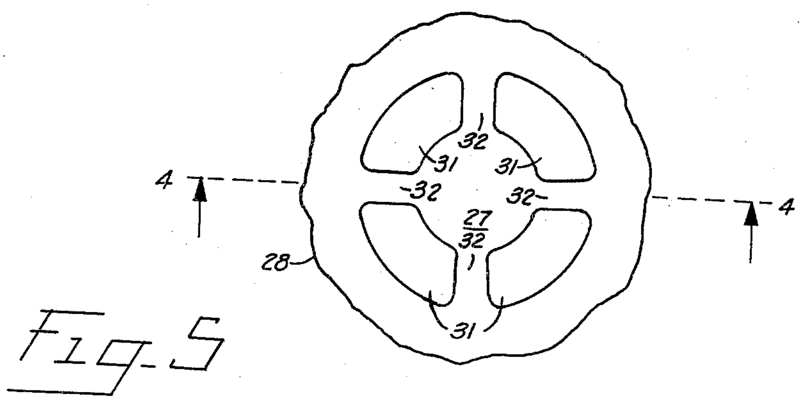
FIGURE 5 is a greatly enlarged plan view of the diaphragm.

The upper portion of the axial bore is enlarged to form a recess which supports a diaphragm 27 by means of an integral supporting disc 28 which is threaded into the block 21. As best shown in FIGS. 4 and 5, the diaphragm 27 and the supporting disc 28 are preferably formed from a single piece of aluminum. The central portion containing the diaphragm 27 may be partially machined and then reduced to its final thickness by etching. The goal is to obtain a radio-frequency conductive diaphragm having a very small mass with a high compliance radio-frequency conductive connection to the supporting disc 28. To this end a number of large holes 31 are formed in the diaphragm leaving an approximately planar circular inner portion joined to the outer portion only by thin strips 32. The strips 32 are corrugated as shown at 33 in FIG. 4 to provide a low compliance mounting. The corrugation may be formed by means of a suitable die which stretches the material. By way of example, the diaphragm may have an inner diameter between holes 31 of approximately one sixteenth of an inch, an overall diameter of approximately one eighth of an inch, and may be from one to three ten thousandths of an inch thick. Thus, only a very small force is required to move the inner diaphragm.

Returning to FIG. 2 it is seen that the lower portion of the block 21 has a rim portion 36 on which is mounted a rigid disc 37. A machine screw 38 is threaded into the disc 37 and bears against the base portion 22 beneath the post 23. The base 22 is thin enough so that the pressure of the screw 38 can deform the base slightly and thus vary the spacing between the end of the post 23 and the diaphragm. The post 23 may have a flattened upper end with a diameter of about 0.020″ when used with frequencies around 9,000 mc. p.s. and may be spaced by from 0.001″ to 0.005″ away from the diaphragm 27.

Consider for a moment the passive element as so far described, in the absence of all of the structure shown in FIG. 2 as lying above the diaphragm 27 and its support 28. Such a passive element has been found to be a very efficient microwave-acoustic transducer, capable of demodulating modulated microwave energy within the cavity so as to be generate acoustic energy and capable of modulating microwave energy within the cavity in accordance with acoustic energy incident upon the diaphragm. In the modulation process, acoustic energy striking the diaphragm changes the spacing between the diaphragm and post, varies the reactance of the cavity and its resonant frequency, and consequently varies the amplitude of the microwave energy. In the demodulation process, the amplitude modulation and the resulting frequency variation due to the sidebands produces a variation in the forces of attraction between the post and diaphragm causing a motion of the diaphragm which faithfully reproduces the form of the modulation envelope. When used as an acoustic transducer it may be preferred to use a larger diaphragm but for purposes of the present invention a diaphragm as above described is preferred. In any event the fundamental principles of operation remain the same.

Returning now to FIG. 2, there is shown a metal block 41 very similar to but smaller than the block 21 and provided with a similar axial bore, lateral passageway, base portion 42 and upstanding post 43. A dielectric window 44 closes the end of the lateral passageway and the waveguide 17 is fastened to the block 41 so as to be coupled to the interior resonant cavity. A post 46 is provided to adjust the coupling. A disc 47 has a screw 48 threaded therethrough which bears against the base portion 42 so as to adjust the spacing between the end of the post 43 and the diaphragm 27. The post 43 has a flattened end with a diameter preferably less than that of the end of post 23. For example, if the block 41 is dimensioned so that the cavity is resonant at about 27,000 mc. p.s., the diameter may be about 0.007″ or 0.008″. However, the spacing between the post and the diaphragm 27 should be the same, that is, from about 0.001″ to 0.005″.

In operation, low level modulated microwave energy from the source 11 passes through the waveguide 12 and the window 24 to the cavity within block 21. The modulation varies the forces of attraction between the diaphragm 27 and the post 23 causing a motion of the diaphragm which follows the modulation envelope. High level unmodulated microwave energy from the source 14 enters the small cavity within block 41 where it is modulated by the motion of diaphragm 27 due to the change in capacitance between the diaphragm 27 and the post 43. The modulated energy is transmitted through the window 44, the waveguide 17, the duplexer 16 and the waveguide 18 to the utilization device 19.

Although the specific embodiment described illustrates the general case in which the input and output carrier frequencies are different, this arrangement is not necessary since both cavities of the passive element 13 could be made the same size in which case the input and output carrier frequencies would be the same. Amplification occurs in this case because the percentage of modulation established in the output cavity is substantially the same as that present in the input cavity while the amplitude of the unmodulated carrier applied to the output cavity can be many times the amplitude of the input wave. In the case of a frequency increase, as illustrated, a further effect contributing to amplification is that the same motion of the diaphragm will cause a larger percentage change in reactance in the smaller cavity. The invention may also be used to obtain an output carrier of lower frequency than the input merely by interchanging the input and output connections.

The device can be left at atmospheric pressure and will operate very satisfactorily. However, the air between the diaphragm 27 and the posts 23 and 43 retards the motion of the diaphragm somewhat and improved operation is obtained when both cavities are evacuated.

Although a specific embodiment has been described, many modifications will occur to those skilled in the art. It is therefore desired that the invention be limited only by the true scope of the appended claims.

What is claimed is:

1. Microwave apparatus comprising, a first cavity resonator, a second cavity resonator, said resonators having a common wall, said wall including a conductive diaphragm, a conductive member in each resonator fastened to one wall and having a portion extending to a position adjacent to said diaphragm, and means for coupling microwave energy into and out of each of said resonators.

2. Apparatus according to claim 1 in which said resonators are resonant at different frequencies.

3. Microwave apparatus comprising, a first cavity resonator, a second cavity resonator, said resonators having a common wall, said wall including a conductive diaphragm, a conductive post in each resonator fastened to that wall which is opposite said diaphragm and extending toward said diaphragm, each of said posts having a flattened end approximately parallel to and spaced from said diaphragm, and means for coupling microwave energy into and out of each of said resonators.

4. Microwave apparatus comprising, a first cavity resonator, a second cavity resonator, said resonators having a common wall, said common wall including a resiliently mounted planar conductive diaphragm, a conductive post in each resonator fastened to that wall which is opposite said common wall and extending toward said diaphragm, said posts each having a flattened end approximately parallel to and spaced from said diaphragm, means for adjustably deforming each of said opposite walls in a direction perpendicular to said diaphragm whereby the spacing between each of said flattened ends and said diaphragm may be adjusted, and means for coupling microwave energy into and out of each of said resonators.

5. Apparatus for changing the carrier frequency of modulated microwave energy comprising, a first cavity resonator resonant at the frequency of the carrier of the modulated microwave energy, a source of unmodulated microwave energy, a second cavity resonator resonant at the frequency of the said source, said resonators having a common wall, said wall including a compliantly mounted conductive diaphragm, a conductive member in each resonator fastened to one wall and having a portion extending to a position in proximity to said diaphragm, means for coupling the modulated microwave energy to said first resonator, and means for coupling said second resonator to said source.

6. Apparatus for amplifying modulated microwaves comprising, first and second cavity resonators, said resonators having a common wall including a diaphragm movable under the influence of modulated microwave energy, means for coupling the modulated microwaves to be amplified to said first resonator, a source of unmodulated microwaves, a duplexer, a utilization device, and means including said duplexer for transmitting microwaves from said source to said second resonator and for transmitting modulated microwaves from said second resonator to said utilization device.

7. Apparatus for amplifying modulated microwaves comprising, first and second cavity resonators, said resonators having a common wall including a conductive diaphragm, a conductive post in each of said resonators fastened to the wall opposite said common wall, said posts extending from said opposite walls toward said diaphragm and each having a flattened end adjacent to but spaced from said diaphragm, means for coupling the modulated microwaves to be amplified to said first resonator, a source of unmodulated microwaves, a duplexer, a load device, and means including said duplexer for transmitting microwaves from said source to said second resonator and for transmitting modulated microwaves from said second resonator to said load device.

References Cited in the file of this patent

UNITED STATES PATENTS

| | | |
|---|---|---|
| 2,442,614 | Norton | June 1, 1948 |
| 2,451,769 | Norton | Oct. 19, 1948 |
| 2,453,453 | Norton | Nov. 9, 1948 |
| 2,596,531 | Clarke | May 13, 1952 |
| 2,643,280 | Bernier | June 23, 1953 |
| 2,711,514 | Rines | June 21, 1955 |